United States Patent
Owen et al.

(10) Patent No.: US 12,510,645 B2
(45) Date of Patent: Dec. 30, 2025

(54) ULTRASOUND SYSTEM WITH ASYMMETRIC TRANSMIT SIGNALS

(71) Applicant: KONINKLIJKE PHILIPS N.V., Eindhoven (NL)

(72) Inventors: Neil Owen, Eindhoven (NL); Harry Amon Kunkel, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 946 days.

(21) Appl. No.: 15/737,447

(22) PCT Filed: Jun. 28, 2016

(86) PCT No.: PCT/IB2016/053845
§ 371 (c)(1),
(2) Date: Dec. 18, 2017

(87) PCT Pub. No.: WO2017/002007
PCT Pub. Date: Jan. 5, 2017

(65) Prior Publication Data
US 2018/0156904 A1    Jun. 7, 2018

Related U.S. Application Data

(60) Provisional application No. 62/185,966, filed on Jun. 29, 2015.

(51) Int. Cl.
*G01S 7/52* (2006.01)
*A61B 8/00* (2006.01)
(Continued)

(52) U.S. Cl.
CPC ........ *G01S 7/52095* (2013.01); *A61B 8/4444* (2013.01); *A61B 8/4488* (2013.01);
(Continued)

(58) Field of Classification Search
CPC .............. G01S 7/52095; G01S 7/5202; G01S 7/52022; G01S 7/52042; G01S 15/8915;
(Continued)

(56) References Cited

U.S. PATENT DOCUMENTS

| 5,581,517 A | 12/1996 | Gee et al. |
| 6,482,157 B2 | 11/2002 | Robinson |

(Continued)

FOREIGN PATENT DOCUMENTS

| JP | 2001016677 A | 1/2001 |
| JP | 2006217942 A | 8/2006 |

(Continued)

OTHER PUBLICATIONS

AzimaIDLI, 2009 "Vibration Amplitude Measurement", 2009 (Year: 2009).*

(Continued)

*Primary Examiner* — Keith M Raymond
*Assistant Examiner* — Amy Shafqat

(57) ABSTRACT

An ultrasound system drives the elements of an ultrasound probe with asymmetric transmit signals which reinforce poling of the probe transducer. The use of asymmetric transmit signals enables a transducer element to withstand a significantly higher RF transmit voltage without degradation, which in turn enables higher acoustic output and improved reliability. This is particularly beneficial with single crystal transducer material when used to generate high energy pressure waves of long duration such as shear wave push pulses.

14 Claims, 3 Drawing Sheets

(51) Int. Cl.
*B06B 1/02* (2006.01)
*B06B 1/06* (2006.01)
*G01S 15/89* (2006.01)
*H10N 30/853* (2023.01)

(52) U.S. Cl.
CPC ............ *A61B 8/4494* (2013.01); *A61B 8/485* (2013.01); *B06B 1/0215* (2013.01); *B06B 1/0622* (2013.01); *G01S 7/5202* (2013.01); *G01S 7/52022* (2013.01); *G01S 7/52042* (2013.01); *G01S 15/8915* (2013.01); *B06B 2201/76* (2013.01); *H10N 30/8548* (2023.02); *H10N 30/8554* (2023.02)

(58) Field of Classification Search
CPC .............. G01S 15/895; G01S 15/8963; G01S 7/52026; G01S 7/5209; A61B 8/485; A61B 8/4494; A61B 8/4488; A61B 8/4444; B06B 1/0622; B06B 1/0215; B06B 2201/76; B06B 1/0644; B06B 1/06; B06B 1/0662; B06B 1/0651; H01L 41/1876; H01L 41/1875
See application file for complete search history.

(56) References Cited

U.S. PATENT DOCUMENTS

| | | | |
|---|---|---|---|
| 6,497,660 B1 | 12/2002 | Dillman et al. | |
| 6,695,783 B2 | 2/2004 | Henderson et al. | |
| 6,937,176 B2* | 8/2005 | Freeman | G01S 7/52095 341/143 |
| 7,500,953 B2* | 3/2009 | Oraevsky | G01N 21/4795 600/458 |
| 7,715,204 B2 | 5/2010 | Miller | |
| 8,049,482 B2* | 11/2011 | Tang | H02M 3/1584 323/272 |
| 8,137,272 B2 | 3/2012 | Cooley et al. | |
| 8,562,112 B2 | 10/2013 | Fujii et al. | |
| 10,311,685 B1* | 6/2019 | Long | G10K 1/063 |
| 11,095,204 B2* | 8/2021 | Oak | H02M 1/088 |
| 11,280,846 B1* | 3/2022 | Quy | G01R 31/42 |
| 2003/0048698 A1* | 3/2003 | Barnes | G01S 7/52038 367/181 |
| 2004/0254459 A1* | 12/2004 | Kristoffersen | B06B 1/0215 600/437 |
| 2005/0281419 A1* | 12/2005 | Miyazaki | B06B 1/0292 381/191 |
| 2007/0083119 A1* | 4/2007 | Adachi | A61B 8/00 600/437 |
| 2008/0021323 A1 | 1/2008 | Tsao et al. | |
| 2008/0200809 A1 | 8/2008 | Shifrin | |
| 2009/0156935 A1* | 6/2009 | Frisa | A61B 8/14 600/447 |
| 2010/0256498 A1* | 10/2010 | Tanaka | B06B 1/0215 600/459 |
| 2011/0074888 A1* | 3/2011 | Fujii | H01L 41/042 310/317 |
| 2013/0131511 A1 | 5/2013 | Peterson et al. | |
| 2013/0301380 A1* | 11/2013 | Oraevsky | A61B 8/5215 367/7 |
| 2014/0018679 A1 | 1/2014 | Chen et al. | |
| 2014/0042574 A1* | 2/2014 | Carman | H01L 43/10 257/421 |
| 2014/0062261 A1 | 3/2014 | Yamamoto et al. | |
| 2014/0144240 A1* | 5/2014 | Barlow | H03K 17/693 73/632 |
| 2014/0288429 A1 | 9/2014 | Taniguchi | |
| 2015/0133782 A1 | 5/2015 | Yoshikawa | |
| 2015/0188456 A1* | 7/2015 | Ko | H01L 41/083 318/116 |
| 2015/0289849 A1* | 10/2015 | Taniguchi | A61B 8/4483 600/443 |
| 2015/0320394 A1* | 11/2015 | Arnal | G01S 7/52079 600/427 |
| 2015/0372219 A1* | 12/2015 | Yamashita | H01L 41/338 310/334 |
| 2017/0014101 A1* | 1/2017 | Oraevsky | A61B 5/14552 |
| 2017/0182285 A1* | 6/2017 | Tyler | A61B 5/4806 |
| 2018/0056095 A1* | 3/2018 | Messerly | B29C 65/4805 |

FOREIGN PATENT DOCUMENTS

| | | |
|---|---|---|
| JP | 2015062621 A | 4/2015 |
| JP | 2015092938 A | 5/2015 |

OTHER PUBLICATIONS

All About Circuits, "Measurements of AC Magnitude. Chapter 1—Basic AC Theory", Jun. 7, 2015 (Year: 2015).*
Herres, "When RMS amplitude is important and when it isn't", Test & Measurement Tips, Nov. 20, 2020 (Year: 2020).*
Sarma, "Introduction to Electrical Engineering", pp. 223-361, 394,-424-439, 625-650, 666, 670, 685-687, 710, Oxford University Press (Year: 2001).*
Datta, S. (Feb. 14, 2014). Piezoelectric Materials: Crystal Orientation andPoling Direction. Retrieved from COMSOL Blog: https://www.comsol.com/blogs/piezoelectric-materials-crystal-orientation-poling-direction/ (Year: 2014).*
Song et al "Comb-Push Ultrasound Shear Elastography (CUSE): A Novel and Fast Technique for Shear Elasticity Imaging" Ultrasonics Syposium 2012, IEEE p. 1842-1845.

* cited by examiner

ULTRASOUND SYSTEM WITH ASYMMETRIC TRANSMIT SIGNALS

This application is the U.S. National Phase application under 35 U.S.C. § 371 of International Application No. PCT/IB2016/053845, filed on Jun. 28, 2016, which claims the benefit of Provisional Application Ser. No. 62/185,966, filed Jun. 29, 2015. These applications are hereby incorporated by reference herein.

This invention relates to medical diagnostic ultrasound systems and, in particular, to an ultrasound system which produces asymmetric transmit signals to maintain the polarization of an ultrasonic transducer array probe.

An ultrasound probe transmits ultrasound waves and receives ultrasonic echo signals with piezoelectric transducer elements that mechanically deflect when driven by a high voltage signal and convert vibrations due to received echo signals into electrical signals. Traditionally these piezoelectric elements are made of ceramic material such as PZT (lead zirconate titanate), a polycrystalline ceramic material, preferred for its greater mechanical efficiency. PZT is a polycrystalline ceramic material. About fifteen years ago, research led to the developments of single crystal materials for ultrasound transducers, such as PZN-PT (lead zinc niobate-lead titanate) and PMN-PT (lead magnesium niobate-lead titanate). As used herein, the term single crystal is used to denote oriented piezoelectric crystals, in which the crystal comprises very few domains (all aligned in direction to give maximum net piezoelectric response), and single domain crystals, in which the crystal comprises a single domain of material oriented to give maximum piezoelectric response. As compared to PZT-type ceramics, PZN-PT and PMN-PT single crystals have been developed with greater efficiency of conversion of electrical energy to mechanical energy and vice versa. Hence, single crystal transducers are preferred for many diagnostic ultrasound applications such as harmonic imaging. See, for instance, U.S. Pat. No. 6,532,819 (Chen et al.)

These new materials are not without their own limitations, however. These materials have been found to exhibit lower Curie temperatures and lower electric coercive fields than the typical PZT-type ceramics used for medical imaging. These lower electric coercive fields make these single crystal materials more susceptible to depoling when used in applications requiring high electric driving fields and also sustained high energy transmission. When an ultrasound transducer is fabricated, the piezoelectric material in the transducer can undergo a polarization process, also known as poling, to improve the sensitivity and efficiency of the transducer elements. During poling, the piezoelectric material is subjected to an electric field greater than the electric coercive field of the material. The poling field is applied for a length of time sufficient to align the domains to achieve a net electric polarization in the material. Poling the material at higher temperatures can accelerate the process and shorten the length of time required to achieve polarization. Once cooled and the poling field is removed, the aligned piezoelectric domains become fixed in orientation.

When the transducer is subjected to high sustained voltages during operation this alignment can be disrupted, creating a reduction in electric polarization and a reduction of transducer sensitivity and efficiency. This reduction in electric polarization is known as depolarization. To prevent depolarization, an electric direct current (DC) bias field can be provided across the piezoelectric elements of the transducer to counter the electric fields that can depole the piezoelectric material while also not resulting in a reduction of the radio frequency (RF) field used in transducer operation. Unfortunately, adding an electric DC bias field requires extra electrical components in the transducer handle and adds complexity to the design. Thus, it would be desirable to have a method to maintain the polarization of the piezoelectric material without the use of DC bias.

One of the uses of diagnostic ultrasound is to diagnose lesions in the body by tissue elasticity or stiffness. One approach to elasticity measurement is a shear wave measurement. When a point in the body is compressed, then released, the adjoining tissue is compressed downward, then rebounds back up when the compressive force is released. But since the tissue where the compressive force is applied is continuously joined to surrounding tissue, the uncompressed tissue lateral of the force vector will respond to the up-and-down movement of the compressed tissue. A rippling effect in this lateral direction, referred to as a shear wave, is the response in the surrounding tissue to the downward compressive force. The shear wave will travel at one velocity through soft tissue, and at another, higher velocity through hard tissue. By measuring the velocity of the shear wave at a point in the body, information is obtained as to pathologically-relevant characteristics of the tissue at that location. It has been shown that the force needed to push the tissue downward can be produced by the radiation pressure from an ultrasound pulse, commonly called a "push pulse." Push pulses are typically long (hundreds of microseconds) pulses produced by the application of sustained high voltage drive signals to the transducer, which incurs the risk of depoling. Since the same "push pulse" is typically repeated for measurements at centimeter-sized increments across the body, the shear wave technique can significantly increase the depoling problem, particularly when the probe has a single crystal material transducer. In some aspects, the present invention provides ultrasound systems which transmits ultrasonic energy into a body. The ultrasound systems can include an ultrasound probe having an array of ultrasonic transducer elements, and a transmit beamformer having transmit channels coupled to the ultrasonic transducer elements and configured to apply asymmetric transmit signals to the elements during their respective transmit intervals. The transmit beamformer can be configured to apply asymmetric RF signals, and/or the system can include a DC bias circuit and the asymmetric signals can include a symmetric RF signal on a DC bias.

In certain aspects, the transducer elements can include piezoelectric ceramic transducer elements, which can be single crystal transducer elements. The single crystal transducer elements can be made of a variety of materials, such as single crystal PMN-PT, PZN-PT, or PIN-PMN-PT (lead indium niobate-lead magnesium niobate-lead titanate).

In some aspects, the systems can include a transmit/receive (T/R) switch coupling each transmit channel to a transducer element, and optionally a probe cable coupling the T/R switches to the transducer elements.

In certain aspects, the ultrasonic transducer elements can include negatively poled transducer elements, and in such instances the asymmetric transmit signals exhibit a mean amplitude value which is negative with respect to a zero reference voltage. The ultrasonic transducer elements can include positively poled transducer elements, and the asymmetric transmit signals can exhibit a mean amplitude value which is positive with respect to a zero reference voltage.

In some aspects, each transmit channel can include a hardware addressable memory device or shift register configured to store digital transmit signal data. Each transmit channel can also include a digital-to-analog converter coupled to receive digital transmit signal data to convert the data to an analog transmit signal. Each transmit channel can include a high voltage transmit amplifier coupled to receive an analog transmit signal and apply a high voltage transmit signal to a transducer element.

In certain aspects, the present invention includes using the asymmetric transmit signals in combination with shearwave elastography. As such, in some embodiments, the asymmetric transmit signals can include push pulse transmit signals. The push pulse transmit signals can be, for example, 50 to 1000 microseconds in duration.

In certain embodiments of the present invention, an ultrasound system is described which drives the transducer elements of the probe with asymmetric transmit signals. The amplitude asymmetry of the transmit signal creates an electric field with larger magnitudes in the direction that reinforces the polarization of the piezoelectric material, and smaller magnitudes in the direction that opposes and degrades the polarization of the piezoelectric material. The asymmetric transmit signals reinforce polarization because net energy delivered to the transducer element over the duration of the transmit pulse creates net mechanical and electric forces that work to keep domains in alignment and polarization maintained.

Figure 1:
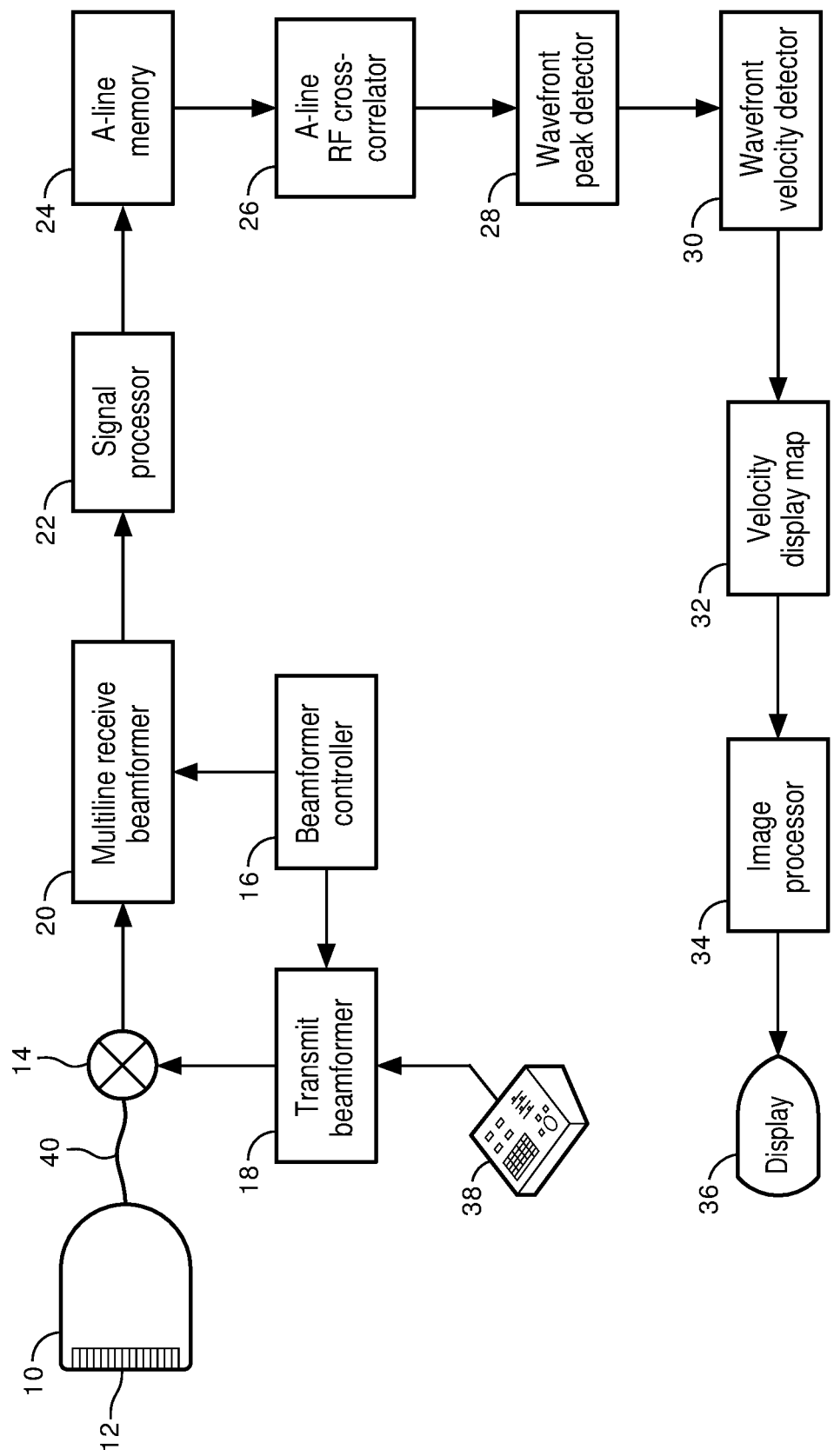
FIG. 1 illustrates in block diagram form an ultrasonic diagnostic imaging system which drives the elements of the probe transducer array with asymmetric transmit signals.
Figure 4:
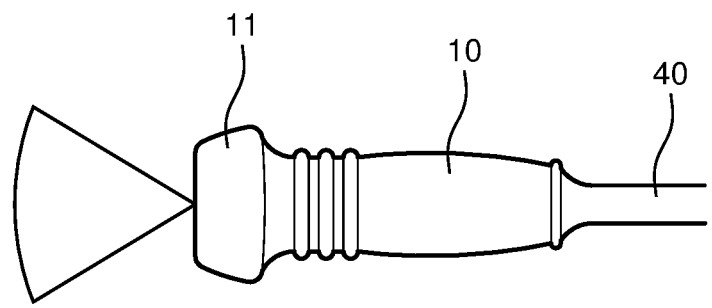
FIG. 4 illustrates major components of an ultrasound probe, in accordance with an embodiment of the present invention.

Referring now to FIG. 1, an ultrasound system which produces asymmetric transmit signals for an ultrasound probe in accordance with the principles of the present invention is shown in block diagram form. In the illustrated implementation the ultrasound system is set up to transmit push pulses for the measurement of shear waves in the body. The ultrasound probe 10 has a transducer array 12 of transducer elements which operate to transmit and receive ultrasound signals. The elements of the transducer array 12 are made of a piezoelectric ceramic material such as PZT, PMN-PT, PZN-PT or PIN-PMN-PT (lead indium niobate-lead magnesium niobate-lead titanate). The array can be fabricated as a one dimensional (1D) or a two dimensional (2D) array of transducer elements. Either type of array can scan a 2D plane and the two dimensional array can be used to scan a volumetric region in front of the array. A probe cable 40 connects the probe to the ultrasound system mainframe. FIG. 4 is a side view of a typical ultrasound probe 10, with the probe cable 40 attached at the proximal end of the probe handle. The transducer array 12 is in the distal end 11 of the probe, positioned to transmit ultrasound and receive echo signals over a scanning area 80 in front of the probe when the distal end is in acoustic contact with the body of a patient.

The transducer array elements of the probe 10 are coupled to a transmit beamformer 18 and a multiline receive beamformer 20 in the ultrasound system by a transmit/receive (T/R) switch 14. Transmit beamformers are well known in the art and are described in US Pat. pub. no. 2013/0131511 (Peterson et al.), U.S. Pat. No. 6,937,176 (Freeman et al.), U.S. Pat. No. 7,715,204 (Miller), and U.S. Pat. No. 5,581,517 (Gee et al.) for instance, each of which is incorporated by reference in its entirety. As described in these publications, a transmit beamformer for a transducer array has multiple channels, each of which can transmit a drive signal or pulse or waveform for a transducer element at an independently programmed time in relation to the other channels. It is the selected relative timing of the application of the drive signals to the individual transducer elements which provides transmit beam focusing and steering. Coordination of transmission and reception by the beamformers is controlled by a beamformer controller 16, which is controlled by user operation of a user control panel 38. The user can operate the control panel to command the ultrasound system to transmit a single push pulse or multiple simultaneous push pulses during shear wave imaging, for instance. The multiline receive beamformer produces multiple, spatially distinct receive lines (A-lines) of echo signals during a single transmit-receive interval. Multiline beamformers are known in the art as described in U.S. Pat. No. 6,482,157 (Robinson), U.S. Pat. No. 6,695,783 (Henderson et al.), and U.S. Pat. No. 8,137,272 (Cooley et al.), for instance, each of which is incorporated by reference in its entirety. The echo signals are processed by filtering, noise reduction, and the like by a signal processor 22, then stored in an A-line memory 24, a digital memory which stores the echo signal data received along the A-lines. Temporally distinct A-line samples relating to the same spatial vector location are associated with each other in an ensemble of echoes relating to a common point in the image field. The RF echo signals of successive A-line sampling of the same spatial vector are cross-correlated by an A-line RF cross-correlator 26, a processor programmed to perform cross-correlation of signal data, to produce a sequence of samples of tissue displacement for each sampling point on the vector. Alternatively, the A-lines of a spatial vector can be Doppler-processed to detect shear wave motion along the vector, or another phase-sensitive techniques can be employed. A wavefront peak detector 28 is responsive to detection of the shear wave displacement along the A-line vector to detect the peak of the shear wave displacement at each sampling point on the A-line. In a preferred embodiment this is done by a processor performing curve-fitting, although cross-correlation and other interpolative techniques can also be employed if desired. The time at which the peak of the shear wave displacement occurs is noted in relation to the times of the same event at other A-line locations, all to a common time reference, and this information is coupled to a wavefront velocity detector 30, a processor which differentially calculates the shear wave velocity from the peak displacement times on adjacent A-lines. This velocity information is coupled into a velocity display map 32 stored in a buffer, which indicates the velocity of the shear wave at spatially different points in a 2D or 3D image field. The velocity display map is coupled to an image processor 34 which processes the velocity map, preferably overlaying an anatomical ultrasound image of the tissue, for display on an image display 36. Further details of the ultrasound system components of FIG. 1 can be found in US Pat. pub. no. 2013/0131511 (Peterson et al.), which is incorporated by reference in its entirety.

Figure 2:
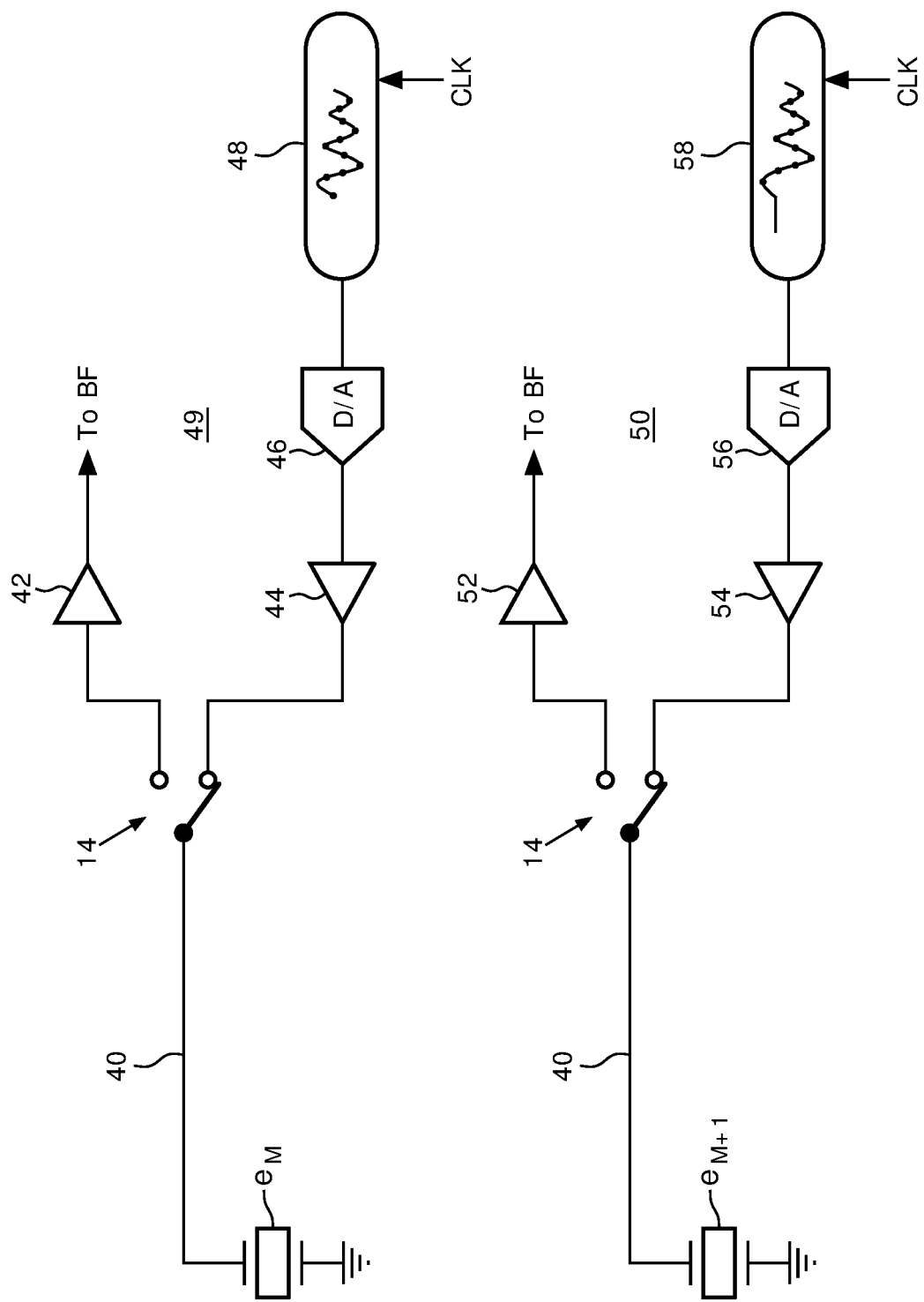
FIG. 2 is a schematic illustration of two channels of a transmit beamformer coupled to two elements of a transducer array.

FIG. 2 is a schematic drawing of components of two channels of transmit and receive beamformers coupled by T/R switches 14 and signal lines of a probe cable 40 to elements $e_M$ and $e_{M+1}$ of an N element probe array transducer. The T/R switches 14 are shown as set in the transmit position.

When set in the receive position, a switch couples a transducer element to an amplifier 42, 52 at the input to a receive beamformer channel. T/R switches are commercially available, such as the TX810 from Texas Instruments of Dallas, Texas, USA. When set as shown for transmit, a channel of the transmit beamformer 18 is coupled to a transducer element. Each transmit channel 49, 50 in the illustrated implementation has a hardware addressable memory device or shift register 48, 58, into which is loaded digital data of a transmit signal as depicted by the sampled waveform illustrations. When it is time for the element coupled to a channel to transmit an ultrasound signal during a transmit interval, the stored digital signal data is addressed or clocked out of the memory device or shift register to a digital-to-analog converter 46, 56. The converter converts the digital data to an analog transmit signal which is amplified by a high voltage transmit amplifier 44, 54. The peak drive voltages on the transducer elements are typically in the range of 5 to 100 volts, depending on the imaging mode. The high voltage transmit signal is applied to a transducer element $e_M$, $e_{M+1}$ by a T/R switch 14 and a signal line of the probe cable 40.

Figure 3:
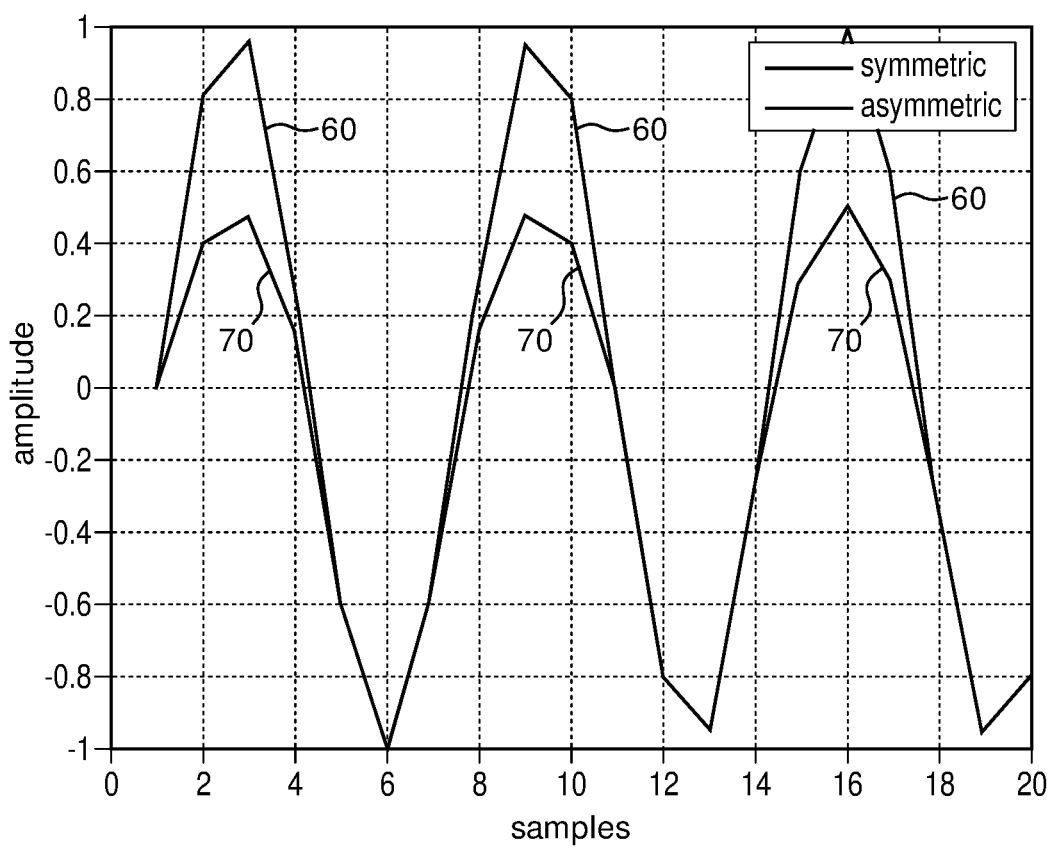
FIG. 3 is a plot of measured transmit waveforms illustrating an asymmetric transmit signal of the present invention.

In accordance with the principles of the present invention, the transmit signals applied to the transducer elements are asymmetric in relation to a zero volt reference potential as illustrated in FIG. 3. This waveform drawing depicts samples of a conventional symmetrical transmit signal 60 and an asymmetric transmit signal 70. The symmetrical transmit signal 60 ranges from peaks of +1 to −1 and has a mean amplitude value of about zero. The asymmetric transmit signal 70 ranges from a positive peak of 0.5 to a negative peak of −1 and has a negative mean value of about −0.25. When applied to a negatively poled transducer element, the asymmetric waveform 70 reinforces the negative poling. When a positively poled transducer is used, the asymmetry of the transmit waveform will have a greater positive peak and/or duration than its negative phase and will have a positive mean value to reinforce the positive poling.

Another embodiment of transmit signals that reinforce transducer polarization is the combination of a symmetric RF signal and a DC bias voltage. This embodiment includes extra circuitry in the transducer or the ultrasound system to create the DC bias. In a practical implementation, the DC bias circuit can be placed between an AC coupling capacitor and the transducer elements of the transducer array. The DC bias can be generated within the transducer assembly or routed to it from the ultrasound system. An advantage of this alternate embodiment is that it permits the use of simpler transmit signal circuitry within the ultrasound system.

An asymmetric transmit signal (e.g., the asymmetric RF signal or the combination of a symmetric RF signal and DC bias voltage) in accordance with the present invention is particularly beneficial in the case of high voltage signals of long duration such as those used to produce a push pulse for shear wave diagnosis. For a push pulse, pulses of high mechanical index (MI) (e.g., 1.5 to 1.9) and long durations are used so that sufficient energy is transmitted to displace the tissue downward along the beam direction and cause the development of a shear wave. In a typical implementation a push pulse is a long pulse of 50 to 1000 microseconds in duration. A typical duration is 500 microseconds, for instance. With conventional symmetrical transmit signals there is a significant risk of depoling the transducer elements, whereas the asymmetric transmit signals can actually reinforce the poling. This is particularly the case when the transducer elements are of a single crystal material, which will depole at lower electric fields than conventional PZT material. The use of asymmetric transmit signals enables a transducer element to with stand a significantly higher transmit voltage without degradation, which in turn enables higher acoustic output and improved reliability.

What is claimed is:

1. An ultrasound system which transmits ultrasonic energy into a body, the system comprising:
    an ultrasound probe having an array of ultrasonic transducer elements, wherein the array of ultrasonic transducer elements comprises a piezoelectric material with a domain aligned in an orientation providing a polarization of the piezoelectric material; and
    a transmit beamformer having transmit channels coupled to the ultrasonic transducer elements and configured to apply asymmetric transmit signals to the elements during their respective transmit intervals, wherein the asymmetric transmit signals comprise asymmetric positive and negative excursions above and below a transducer reference potential which together produce a non-zero mean amplitude configured to generate a force to maintain the domain aligned in the orientation such that the polarization of the piezoelectric material is reinforced while transmitting the ultrasonic energy into the body.

2. The ultrasound system of claim 1, wherein the ultrasonic transducer elements further comprise piezoelectric ceramic transducer elements.

3. The ultrasound system of claim 1, wherein the transducer elements further comprise single crystal lead magnesium niobite-lead titanate (PMN-PT), lead zinc niobite-lead titanate (PZN-PT), or lead indium niobite-lead magnesium niobite-lead titanate (PIN-PMN-PT).

4. The ultrasound system of claim 1, wherein the ultrasonic transducer elements further comprise negatively poled transducer elements; and
    wherein the asymmetric transmit signals exhibit a mean amplitude value which is negative with respect to a zero reference voltage.

5. The ultrasound system of claim 1, wherein the ultrasonic transducer elements further comprise positively poled transducer elements; and
    wherein the asymmetric transmit signals exhibit a mean amplitude value which is positive with respect to a zero reference voltage.

6. The ultrasound system of claim 1, wherein the transmit beamformer is further configured to apply asymmetric radio frequency (RF) signals.

7. The ultrasound system of claim 1, wherein the system comprises a direct current (DC) bias circuit and the asymmetric signals comprise a symmetric radio frequency (RF) signal on a DC bias.

8. The ultrasound system of claim 1, wherein each transmit channel comprises a hardware addressable memory device or shift register configured to store digital data associated with the asymmetric transmit signals.

9. The ultrasound system of claim 1, further comprising a plurality of transmit/receive (T/R) switches respectively coupling each transmit channel to a transducer element.

10. The ultrasound system of claim 9, further comprising a probe cable coupling the plurality of transmit/receive (T/R) switches to the transducer elements.

11. The ultrasound system of claim 1, wherein each transmit channel further comprises a digital-to-analog converter coupled to receive digital transmit signal data to convert the data to an analog transmit signal.

12. The ultrasound system of claim 11, wherein each transmit channel further comprises a high voltage transmit amplifier coupled to receive an analog transmit signal and apply a high voltage transmit signal to a transducer element.

13. The ultrasound system of claim 1, wherein the asymmetric transmit signals further comprise push pulse transmit signals.

14. The ultrasound system of claim 13, wherein the push pulse transmit signals further produce push pulses of 50 to 200 microseconds in duration.

\* \* \* \* \*